United States Patent
Burgstaler et al.

(10) Patent No.: US 7,121,779 B2
(45) Date of Patent: Oct. 17, 2006

(54) SAFETY DEVICE FOR REMOVING A BOLT, ESPECIALLY A PEDAL BOLT, IN A MOTOR VEHICLE

(75) Inventors: Andree Burgstaler, Dielingen (DE); Jan Dütz, Damme (DE); Simone Papke, Osnabrück (DE)

(73) Assignee: ZF Lemförder Metallwaren AG, (DE)

(*) Notice: Subject to any disclaimer, the term of this patent is extended or adjusted under 35 U.S.C. 154(b) by 0 days.

(21) Appl. No.: 10/875,116

(22) Filed: Jun. 23, 2004

(65) Prior Publication Data

US 2004/0234332 A1 Nov. 25, 2004

Related U.S. Application Data

(63) Continuation of application No. PCT/DE03/02028, filed on Jun. 17, 2003.

(30) Foreign Application Priority Data

Jun. 17, 2002 (DE) .................... 102 27 015

(51) Int. Cl.
*F16B 21/00* (2006.01)
(52) U.S. Cl. ...................... 411/351; 24/265 B
(58) Field of Classification Search ............... 411/351, 411/513, 514, 348, 316–318; 24/265 B
See application file for complete search history.

(56) References Cited

U.S. PATENT DOCUMENTS

| | | | | |
|---|---|---|---|---|
| 1,023,985 A * | 4/1912 | Beaulieu | ...................... | 411/347 |
| 2,012,054 A * | 8/1935 | Ritter | ........................ | 24/265 B |
| 2,382,249 A * | 8/1945 | Megar | ........................ | 24/265 B |
| 2,992,467 A * | 7/1961 | Gaylord | ....................... | 24/606 |
| 3,036,353 A * | 5/1962 | Minutoli | ...................... | 24/642 |
| 4,102,124 A * | 7/1978 | Swager | .......................... | 59/86 |
| 6,014,793 A * | 1/2000 | Howald | ...................... | 24/265 B |
| 6,197,030 B1 * | 3/2001 | Pham | ........................... | 606/72 |
| 2003/0178240 A1 | 9/2003 | Oprisch | | |

FOREIGN PATENT DOCUMENTS

| | | |
|---|---|---|
| DE | 196 17 372 C1 | 1/1998 |
| DE | 100 40 043 C1 | 8/2001 |
| DE | 100 40 270 A1 | 3/2002 |
| DE | 100 57 227 A1 | 5/2002 |
| EP | 0 827 874 A2 | 3/1998 |
| EP | 1 031 485 A2 | 8/2000 |
| EP | 1 266 813 A2 | 12/2002 |
| FR | 2 739 077 A1 | 3/1997 |

* cited by examiner

Primary Examiner—Flemming Saether
(74) Attorney, Agent, or Firm—McGlew & Tuttle, PC

(57) ABSTRACT

A safety device for removing a bearing bolt (2), especially a pedal bolt in a motor vehicle, is provided with at least one first mounting part (3), which has at least one through hole for a bolt connection with at least one connecting piece (1), as well as at least one bearing bolt (2). The bearing bolt (2) extends through the through hole in order to connect the mounting part (3) and the connecting piece (1) with one another. The bearing bolt (2) removing structure has at least one pushing element (4), which compresses the bearing bolt (2) that is compressible in the direction of the axial axis of the bolt (2). The bolt (2) is compressed under the action of a force over at least one plane (6) that is oblique in relation to the bolt axis and moves the bearing bolt (2) out of the mounting part (3) in the compressed state in order to hereby open the mounting point.

9 Claims, 4 Drawing Sheets

SAFETY DEVICE FOR REMOVING A BOLT, ESPECIALLY A PEDAL BOLT, IN A MOTOR VEHICLE

CROSS REFERENCE TO RELATED APPLICATIONS

This is a continuation of and claims the benefit (35 U.S.C. §120 and 365(c)) of copending International Application PCT/DE 03/02028 of Jun. 17, 2003, which designated inter alia the United States and which claims the priority of German Application DE 102 27 015.5 of Jun. 17, 2002. The entire contents of each application is hereby incorporated by reference in its entirety.

FIELD OF THE INVENTION

The present invention pertains to a safety device for removing a bolt, especially a pedal bolt in a motor vehicle, with at least one first mounting part, which has at least one through hole for a bolt connection with at least one connecting piece, as well as at least one bolt, which extends coaxially through the through hole in order to connect the mounting part and the connecting piece with one another, wherein means are provided for removing the bolt for the separation of the connecting piece to perform a safety function.

BACKGROUND OF THE INVENTION

Such safety devices are used, among other things, in the leg room of passenger compartments in motor vehicles in conjunction with pedal connections by means of a bolt to avoid risks of injury because of direct collisions. The risk of injury is due to the fact that the occupants are unable to absorb the accelerating forces occurring in case of a direct collision, so that, among other things, the lower extremities of the persons sitting in the front area are thrown into the leg room. In addition, it also happens in accidents that a deformation of the engine compartment directly or indirectly affects the pedals and moves these into the interior space of the motor vehicle. The injuries occurring as a consequence are painful for the person or persons affected and may even lead to lifelong mutilation.

Various solutions are known from the state of the art to counteract this circumstance. Mainly two types of safety devices are distinguished. On the one hand, the pedal is prevented from moving in the direction of the interior space of the vehicle by the buckling or bending away of a connecting piece; on the other hand, the pedal is prevented from penetrating into the interior space of the vehicle by the opening of the pedal mounting point, caused by the deformation, e.g., bending, of structural components, e.g., sheet metal. The second approach will be further pursued here.

A safety device that prevents the pedal from penetrating into the leg room by the opening of the pedal mounting point is known from DE 100 40 043 C1. The safety device comprises a bearing block, in which the pedals pivotable around an axis are mounted on bolts, which are fixed in the mounts of the bearing block. The bearing block has at least one expandable section, so that the force acting from the outside in an accident leads to deformation of the front firewall and, as a consequence of this, it expands or spreads apart the bearing block. The expansion can be performed by means of a wedge-shaped element, which is driven between the legs of a bearing block. The kinetic energy necessary for this is obtained from the movement of the motor vehicle parts undergoing deformation in relation to one another in an accident. The bolts mounting the pedals are thus released such that the pedals with the bolt are separated from their brackets and do not penetrate into the leg room.

To make sure that the pedals are moved in the direction of the floor of the vehicle in case of a crash, a pedal holding-down device is usually present.

The prior-art safety device has the drawback that at least the deformation areas must be made of a metallic material, which leads to a relatively heavy weight of the mounting parts. Moreover, the assembly effort needed for the prior-art safety device is relatively great and a relatively large space is needed for installation with a pedal holding-down device.

SUMMARY OF THE INVENTION

The object of the present invention is therefore to provide a safety device that requires little space for its installation due to its compact design, is easy to assemble, and, above all, can be manufactured with a low weight.

According to the invention, a safety device for removing a bearing bolt is provided, especially a pedal bolt in a motor vehicle. The device has at least one first mounting part, which has at least one through hole for a bolt connection and at least one said connecting piece, as well as at least one bearing bolt. The bearing bolt extends through the through hole in order to connect the mounting part and the connecting piece with one another. Means are provided for removing the bearing bolt for separating the connecting piece to perform a safety function. The present invention includes the technical feature that the at least one means for removing the bearing bolt comprises a pushing element, which compresses a bearing bolt, which is compressible in the direction of the axial axis of the bolt, during the action of a force over at least one plane extending obliquely in relation to the axis of the bolt. The pushing element moves the bearing bolt in the compressed state out of the mounting part in order to open the mounting point as a result.

This solution offers the advantage that the safety device requires only weak forces to ensure the safety function, as a result of which certain and reliable release is guaranteed.

Another advantage is that the safety device has a very compact design and therefore requires little space for its installation.

Provisions are made in another measure that improves the present invention for the bearing bolt to be a bolt that is plastically compressible in the axial direction. It is guaranteed as a result that the compressed bolt can be easily removed from the pushing element, without special devices being needed.

It is provided according to a possible variant of the present invention that the bearing bolt be a bolt that is elastically compressible in the axial direction, because it can thus be reused, which contributes to environmental protection.

It is particularly advantageous for cost reasons for the bearing bolt to have, e.g., a cylindrical body, which is guided on one side in a tube section with a tube section bottom (end surface), a compression spring being present between the tube section end surface and the front face of the bearing bolt, which front face is being guided in the tube section.

Furthermore, in an advantageous embodiment of the bearing bolt, the bearing bolt has a grooved tube as its middle piece, which is plastically deformable, because an easy-to-mount and inexpensive solution can thus be obtained.

It is particularly advantageous for the bearing bolt to be a multipart, compressible bolt, which has in its center a cylindrical body, which guides a tube section on each side, and a compression spring is present between the cylindrical body and the tube section end surface, so that there always is a contact between the inner surface of the tube section and the outer surface of the cylindrical body. As a result, the safety device can be manufactured with standardized and/or standard parts and can be easily adapted to different conditions by means of the different components.

Finally, it is advantageous for the connecting piece to be a pedal located in a passenger compartment of a motor vehicle, the mounting part being a U-shaped bearing block.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
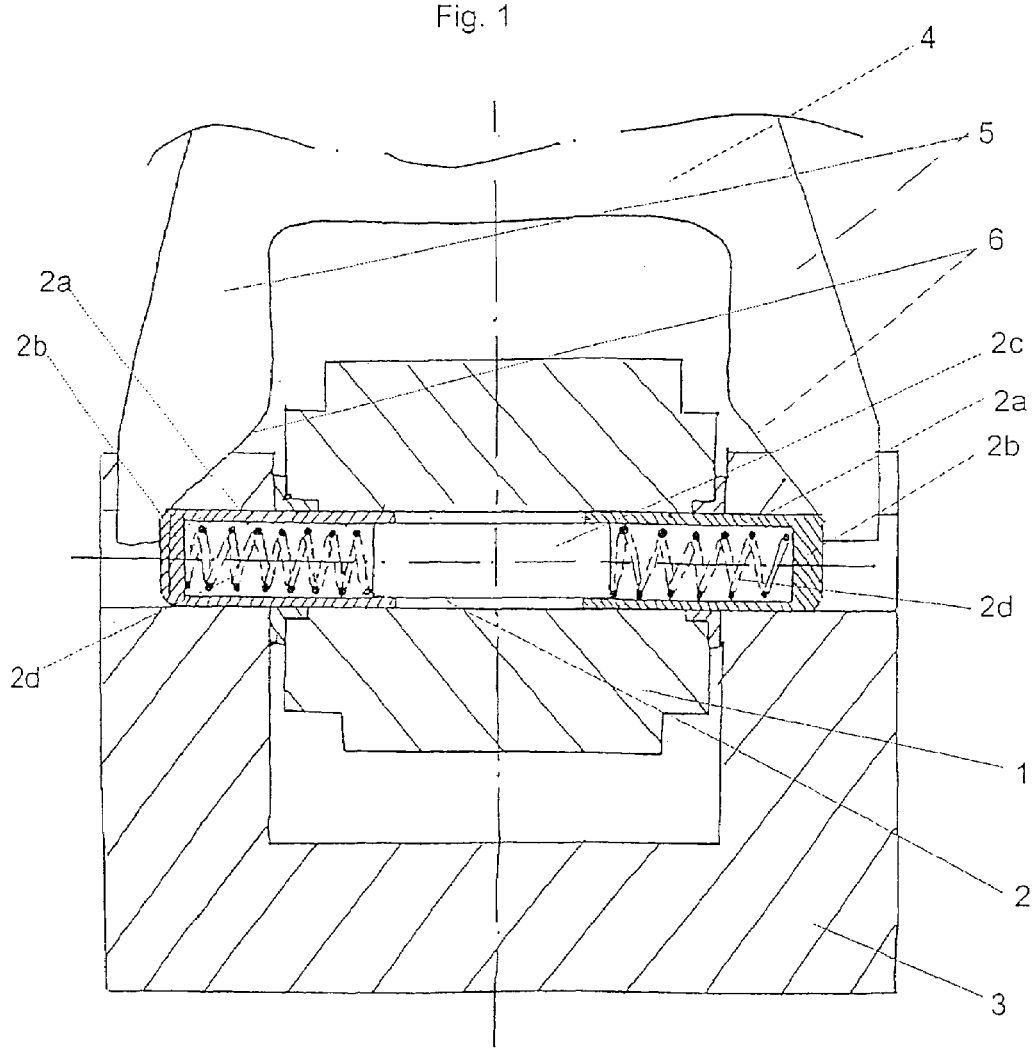
FIG. 1 is a schematic sectional view of a safety device according to the invention.

The safety device according to FIG. 1 comprises a connecting piece 1, which is designed as a pedal and is connected with a mounting part 3 in the form of a U-shaped bearing block via a bearing bolt 2. The bearing bolt 2 is fixed in the mounting part 3 on both sides against displacement in the axial direction of the bolt by means of a pushing element 4. The pushing element 4 has two legs 5. The legs 5 have an initially parallel portion with each leg 5 located at spaced locations from one another. The parallel portions or parallel guide surfaces each transition to an oblique plane guide surface 6 at their respective ends. The legs 5 and the plane surfaces 6 form an abutment for the ends of the bearing bolt 2, along which the bearing bolt 2 can slide. The distance between the two legs 5 of the pushing element 4 must be smaller than the corresponding distance between the two legs of the U-shaped mounting part 3.

The bearing bolt 2 comprises two outer tube sections 2a. Each tube section 2a has an end closed by a tube section end surface 2b. The two outer tube sections 2a are guided on a cylindrical body 2c and are located at spaced locations from one another. A spring assembly 2d each, e.g., a compression spring, is located between the inner side of the tube section end surfaces 2b and the cylindrical body 2c on each side, the spring assemblies making possible the compression of the two tube sections 2a located at spaced locations from each other against the spring force of the two spring assemblies 2d. In case of a direct collision, the mounting part 3 is pressed against the pushing element 4, which is supported at a support part (not shown), which undergoes little or no change in its position in a direct collision. The forces generated during this relative movement of the mounting part 3 and the pushing element 4 in relation to one another are transmitted via the surface of the leg 5 of the pushing element 4, which said surface is designed as an oblique plane, to the compressible bearing bolt 2, as a result of which this bearing bolt is compressed during the displacement along the oblique plane 6 until it fits between the legs of the U-shaped mounting part 3 and the mounting point has opened.

Figure 2:
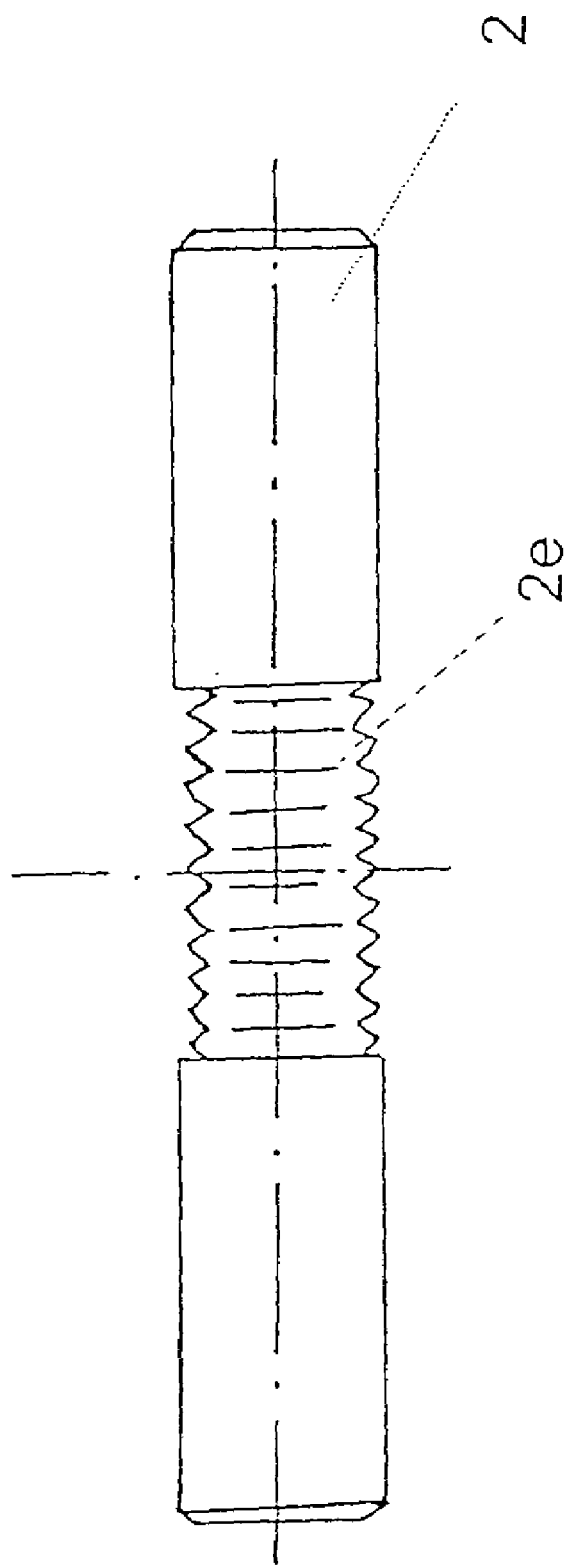
FIG. 2 is a front view of a bearing bolt with a grooved tube according to the invention.

FIG. 2 shows an alternative embodiment of the bearing bolt 2 used with the structure shown in FIG. 1. The middle part of the bearing bolt 2 is designed as a grooved tube 2e according to this embodiment. This middle part of the bearing bolt 2 which is designed as a grooved tube 2e is plastically deformed in case of a crash.

Figure 3:
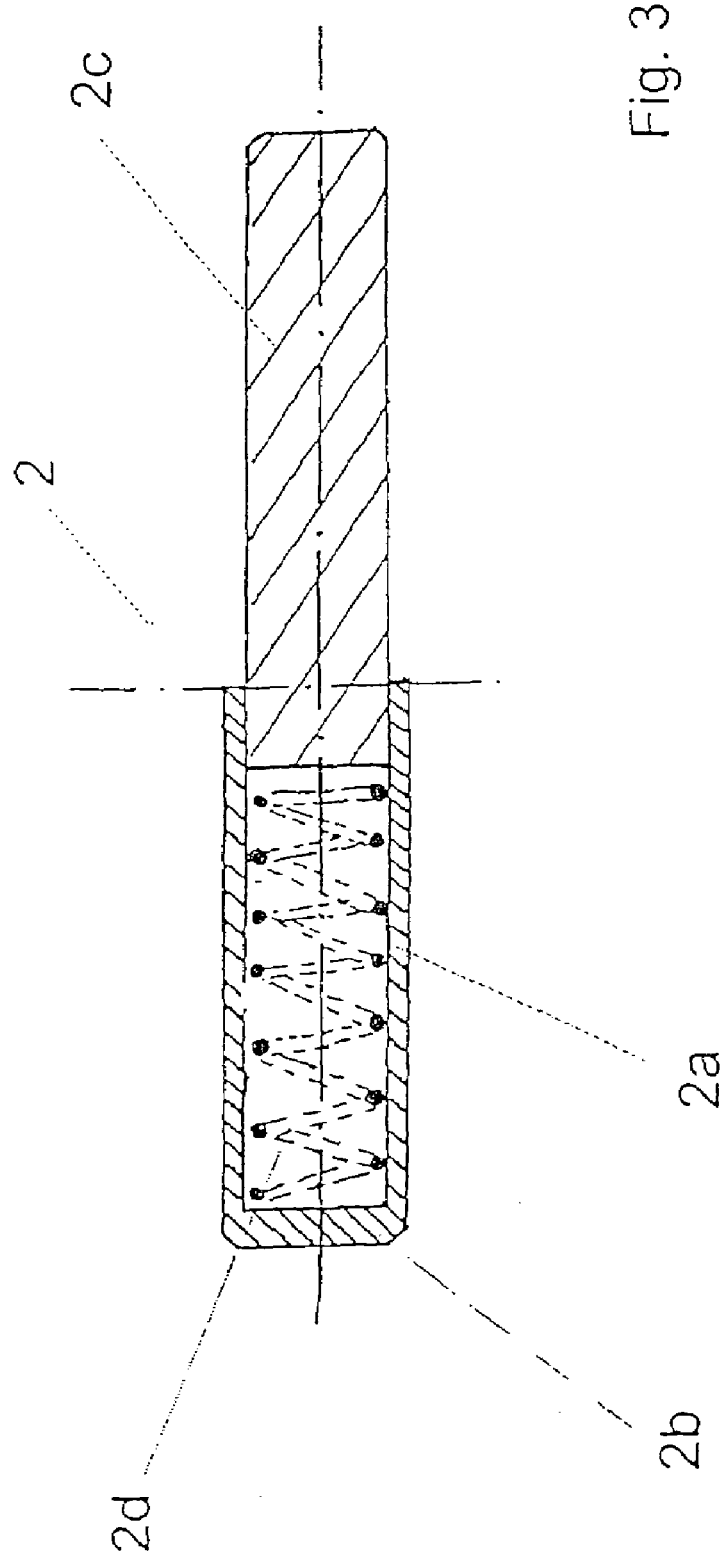
FIG. 3 is a schematic sectional view of a bearing bolt according to the invention.
Figure 4:
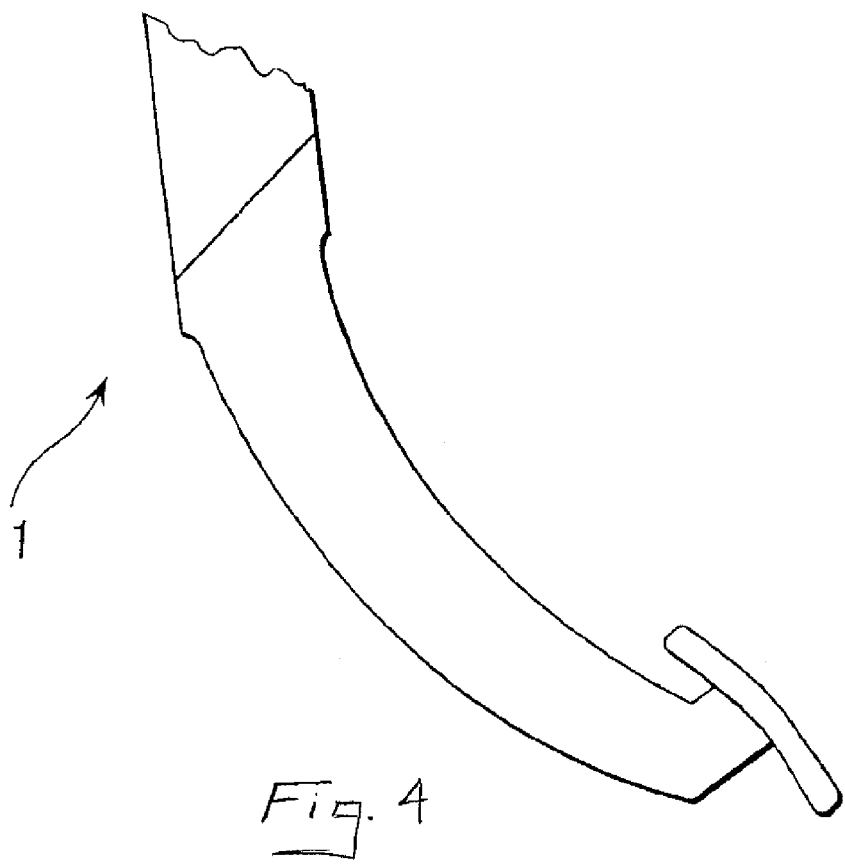
FIG. 4 is a side cutaway view of a connecting piece designed as a pedal.

FIG. 3 shows another possible embodiment of the bearing bolt 2 used with the structure shown in FIG. 1. The bearing bolt 2 has a cylindrical tube section 2a on one side here with a tube section end surface 2b, which is displaceably guided on a cylindrical body 2c. A spring assembly 2d, which counteracts the compression of the bearing bolt 2, is located between the cylindrical body 2c and the inner side of the tube section end surface 2b.

While specific embodiments of the invention have been shown and described in detail to illustrate the application of the principles of the invention, it will be understood that the invention may be embodied otherwise without departing from such principles.

What is claimed is:

1. A safety device comprising:
   a mounting part comprising a U-shaped bearing block with mounting legs spaced apart a mounting distance to form a U-shape including a first leg end with a first through hole and a second leg end with a second through hole and a space in between;
   a pushing element including a first leg and a second leg with at least one oblique guide surface of said first leg and said second leg extending from a dimension greater than said mounting space to a dimension smaller than a distance between said first leg end and said second leg end;
   a compressible bearing bolt placed in between said first leg and said second leg and engaged in said first through hole and said second through hole, said compressible bearing bolt being compressible alongside an axis;
   a vehicle connecting piece comprising a pedal locatable in a passenger compartment of a motor vehicle, said connecting piece having a connecting trough hole receiving said bearing bolt for mounting said pedal to said bearing block, said pushing element first leg and said second leg via said guide surface acting on said compressible bearing bolt to compress said bearing bolt for disconnection of said bearing bolt from said first trough hole and said second through hole upon a predetermined movement of said pushing element relative to said bearing block.

2. A safety device according to claim 1, wherein said compressible bearing bolt is plastically compressible.

3. A safety device according to claim 1, wherein said compressible bearing bolt is elastically compressible.

4. A safety device according to claim 1, wherein said bearing bolt comprises a tube section with a tube section end surface, a cylindrical body, and a compression spring, said cylindrical body being guided on at least one side in said tube section, said compression spring being provided between an inner side of said tube section end surface and a front face of the cylindrical body, said front face being guided in said tube section.

5. A safety device according to claim 1, wherein said bearing bolt has a center portion comprising a grooved tube which is plastically deformable.

6. A safety device according to claim 1, wherein said bearing bolt is a multipart compressible bolt comprising a cylindrical body having an outer surface, a first compression spring and a first tube section having a first inner surface and a first end surface and a second compression spring and a second end tube section having a second inner surface and a second end surface, said cylindrical body being a center portion which guides said first tube section and said second tube section, said first compression spring being disposed between said cylindrical body and said first end surface and said second compression spring being disposed between said cylindrical body and said second end surface, at least one of said first tube section and said second tube section being displaceable on said cylindrical body such that there always is contact between the inner surface of at least one of said first tube section and said second tube section and the outer surface of said cylindrical body.

7. A safety device according to claim 6, wherein said cylindrical body has two opposite abutting faces and said first spring is arranged between the first end surface and a first of the opposite abutting faces and said second spring is arranged between the second end surface and a second of the opposite abutting faces.

8. A safety device for removing a bearing bolt, the safety device comprising:

a mounting part comprising a U-shaped bearing block with mounting legs spaced apart amounting distance to form a U-shape with a first mounting through hole for a bolt connection in one leg and a second mounting through hole for a bolt connection in another leg;

a connecting piece comprising a pedal with a connecting through hole;

a bearing bolt extending through said connecting through hole and with a first end engaged with said first mounting through hole and a second end engaged with said second mounting through hole, said bearing bolt being compressible in an axial direction of an axis of said bearing bolt between said first end and said second end;

a pushing element comprising legs providing a first pushing leg abutment guide with a first parallel guide surface that transitions to a first oblique plane guide surface leading to a first pushing leg end abutting said bearing bolt first end and a second pushing leg abutment guide with a second parallel guide surface that transitions to a second oblique plane guide surface leading toward a second pushing leg end abutting said bearing bolt second end, said first pushing leg parallel guide surface being parallel to said second pushing leg parallel guide surface and spaced apart a compressing distance that is smaller than said mounting distance, whereby movement of said pushing element relative to said bearing block moves said bearing bolt first end and said bearing bolt second end along said oblique plane guide surfaces to said parallel guide surfaces to release said vehicle pedal from said bearing block.

9. A safety device according to claim 8, wherein said legs of said pushing element are in direct contact with said bearing bolt first end and said bearing bolt second end.

* * * * *